(12) United States Patent
Yamauchi

(10) Patent No.: US 7,742,941 B2
(45) Date of Patent: Jun. 22, 2010

(54) TOLL ROAD TOLL PAYING METHOD AND APPARATUS USING A PORTABLE TERMINAL, AND A STORAGE MEDIUM THEREOF

(75) Inventor: Yuji Yamauchi, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 1519 days.

(21) Appl. No.: 10/114,068

(22) Filed: Apr. 3, 2002

(65) Prior Publication Data

US 2003/0115095 A1 Jun. 19, 2003

(30) Foreign Application Priority Data

Dec. 18, 2001 (JP) .............................. 2001-384925

(51) Int. Cl.
*G07B 15/02* (2006.01)
(52) U.S. Cl. ...................................... 705/13
(58) Field of Classification Search .................... 705/13
See application file for complete search history.

(56) References Cited

U.S. PATENT DOCUMENTS

| | | | | |
|---|---|---|---|---|
| 5,381,467 | A | * | 1/1995 | Rosinski et al. ........ 379/121.01 |
| 5,488,360 | A | * | 1/1996 | Ray ............................ 340/933 |
| 5,663,548 | A | * | 9/1997 | Hayashi et al. ............. 235/384 |
| 6,697,730 | B2 | * | 2/2004 | Dickerson ................... 701/200 |
| 6,959,282 | B2 | * | 10/2005 | Kakihara et al. ............... 705/13 |
| 2002/0023027 | A1 | * | 2/2002 | Simonds ....................... 705/26 |
| 2003/0093311 | A1 | * | 5/2003 | Knowlson ..................... 705/10 |

FOREIGN PATENT DOCUMENTS

| | | |
|---|---|---|
| JP | 8-50669 | 2/1996 |
| JP | 11-007562 | 1/1999 |
| JP | 11353506 | * 12/1999 |
| JP | 2000-311262 | 11/2000 |
| JP | 2001-319253 | 11/2001 |
| JP | 2001-325625 | 11/2001 |

OTHER PUBLICATIONS

Financial Services Report, "American Telephone & Telegraph Co. (AT&T) and Vapor Canada of Inc. of Montreal Are Introducing a Smart Card Early Next Year," Dec. 25, 1991, v8, n25, p. 5(1).*
Communication (Notice of Rejection Grounds) for corresponding Japanese Patent Application No. 2001-384925 dated May 31, 2005.

* cited by examiner

*Primary Examiner*—John W Hayes
*Assistant Examiner*—Nathan Erb
(74) *Attorney, Agent, or Firm*—Staas & Halsey LLP

(57) ABSTRACT

A particular application is invoked in a cellular phone (an arbitrary one of a plurality of cellular phones if they exist) of a person who is riding in an automobile prior to the passage of a gate at an entry/exit of a toll road. The cellular phone in which the application is invoked transmits a particular signal (a signal including the information expressing the intention to use the turnpike) different from a normal cellular phone signal when passing through a gate. Data of the particular signal is transferred to a server via the gate. Information about the user, information about the gate at the entry/exit, etc. are recorded, and a turnpike (toll road) toll is charged based on these information. The turnpike toll can be split and paid by a plurality of persons. A user and a split toll payer must be persons who are pre-registered to the server.

3 Claims, 17 Drawing Sheets

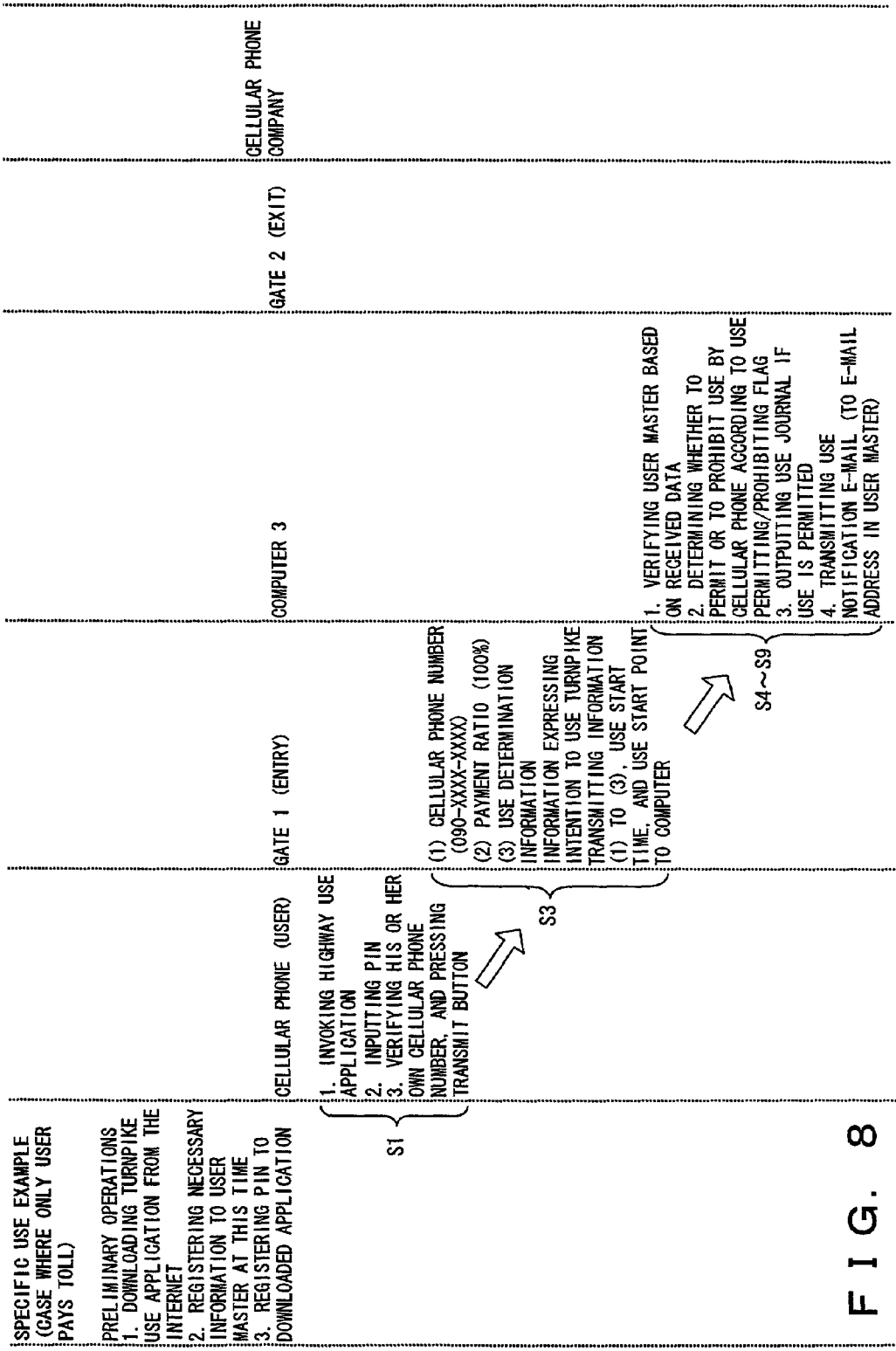
F I G. 8

USER MASTER 70

| USER NAME | CELLULAR PHONE NUMBER | E-MAIL ADDRESS | USER PERMITTING/ PROHIBITING FLAG | AUTOMOBILE IDENTIFIER |
|---|---|---|---|---|
| YAMAUCHI | 090 0000○○○○ | yamauchi @····· | ON | SAPPORO 500 あ 1○△× |
| HIRAJIMA | 090 1111△△△△ | hirajima @····· | ON | SAPPORO 500 あ 2△×○ |
| OKADA | 090 3333××× | okada @····· | ON | SAPPORO 500 あ 3×△△ |

F I G. 1 2 A

TOLL MASTER 80
(UPPER ROW-LARGE AUTOMOBILE/
LOWER ROW-ORDINARY AUTOMOBILE)

| 14000 | 7000 | SAPPORO |
|---|---|---|
| 7000 | HIDAKA | 5000 |
| ABASHIRI | 5000 | 10000 |

F I G. 1 2 B

```
[NONSTOP TURNPIKE SERVICE]

RECEIPT
     2001. 11. 6  13:00:00
ENTRY INTERCHANGE: SAPPORO
EXIT INTERCHANGE: ABASHIRI
      TOLL: 10,000 YEN

TOLL IS RECEIVED UNDER THE
FOLLOWING SPLIT TOLL PAYMENT
         CONDITION
─────────────────────────
    YAMAUCHI: 2,000 YEN
─────────────────────────
    HIRAJIMA: 4,000 YEN
    OKADA:    4,000 YEN
─────────────────────────
```

FIG. 14A

```
[NONSTOP TURNPIKE SERVICE]

SPECIFY PAYMENT RATIO

AUTOMOBILE IDENTIFIER:
SAPPORO 500 あ 1O△×の
─────────────────────────
   [40]% OF HIGHWAY TOLL
─────────────────────────

[SETTLE]/[MODIFY]/[CANCEL]
```

FIG. 14B

```
[NONSTOP TURNPIKE SERVICE]

THE FOLLOWING PAYMENT RATIO
  IS RECEIVED FROM HIRAJIMA
─────────────────────────
AUTOMOBILE IDENTIFIER :
SAPPORO 500 あ   1O△×の
─────────────────────────
  PAY [40]% OF HIGHWAY TOLL
─────────────────────────
IF NO ACKNOWLEDGMENT IS MADE
WITHIN 5 MINUTES, PROCESS IS
PERFORMED BY RECOGNIZING
THIS PAYMENT RATIO TO BE
         ACCEPTED

[ACKNOWLEDGE]/[CANCEL]
```

FIG. 14C

USER JOURNAL (INITIAL VALUE)

| USER CELLULAR PHONE NUMBER (31) | PAYMENT TYPE IDENTIFIER (91) | PAYMENT RATIO (32) | CELLULAR PHONE NUMBER OF SPLIT TOLL PAYER (40a) | PAYMENT RATIO (40b) | CELLULAR PHONE NUMBER OF SPLIT TOLL PAYER (41a) | PAYMENT RATIO (41b) | PAYMENT STATUS IDENTIFIER (92) | TURNPIKE USE START POINT (36) | TURNPIKE USE END POINT (38) | TOLL (39) |
|---|---|---|---|---|---|---|---|---|---|---|
| 090 0000OOOO | SPLIT TOLL PAYMENT | — | — | — | — | — | 0 (INITIAL VALUE) | — | — | — |

FIG. 15A

USER JOURNAL (WHEN PASSING THROUGH ENTRY INTERCHANGE)

| USER CELLULAR PHONE NUMBER (31) | PAYMENT TYPE IDENTIFIER (91) | PAYMENT RATIO (32) | CELLULAR PHONE NUMBER OF SPLIT TOLL PAYER (40a) | PAYMENT RATIO (40b) | CELLULAR PHONE NUMBER OF SPLIT TOLL PAYER (41a) | PAYMENT RATIO (41b) | PAYMENT STATUS IDENTIFIER (92) | TURNPIKE USE START POINT (36) | TURNPIKE USE END POINT (38) | TOLL (39) |
|---|---|---|---|---|---|---|---|---|---|---|
| 090 0000OOOO | SPLIT TOLL PAYMENT | 20% | 090 1111△△△△ | 40% | 090 3333××××  | 40% | 1 (PAYMENT READY) | SAPPORO | — | — |

FIG. 15B

USER JOURNAL (WHEN PASSING THROUGH EXIT INTERCHANGE)

| USER CELLULAR PHONE NUMBER (31) | PAYMENT TYPE IDENTIFIER (91) | PAYMENT RATIO (32) | CELLULAR PHONE NUMBER OF SPLIT TOLL PAYER (40a) | PAYMENT RATIO (40b) | CELLULAR PHONE NUMBER OF SPLIT TOLL PAYER (41a) | PAYMENT RATIO (41b) | PAYMENT STATUS IDENTIFIER (92) | TURNPIKE USE START POINT (36) | TURNPIKE USE END POINT (38) | TOLL (39) |
|---|---|---|---|---|---|---|---|---|---|---|
| 090 0000OOOO | SPLIT TOLL PAYMENT | 20% | 090 1111△△△△ | 40% | 090 3333×××× | 40% | 1 (PAYMENT READY) | SAPPORO | ABASHIRI | 10000 |

FIG. 15C

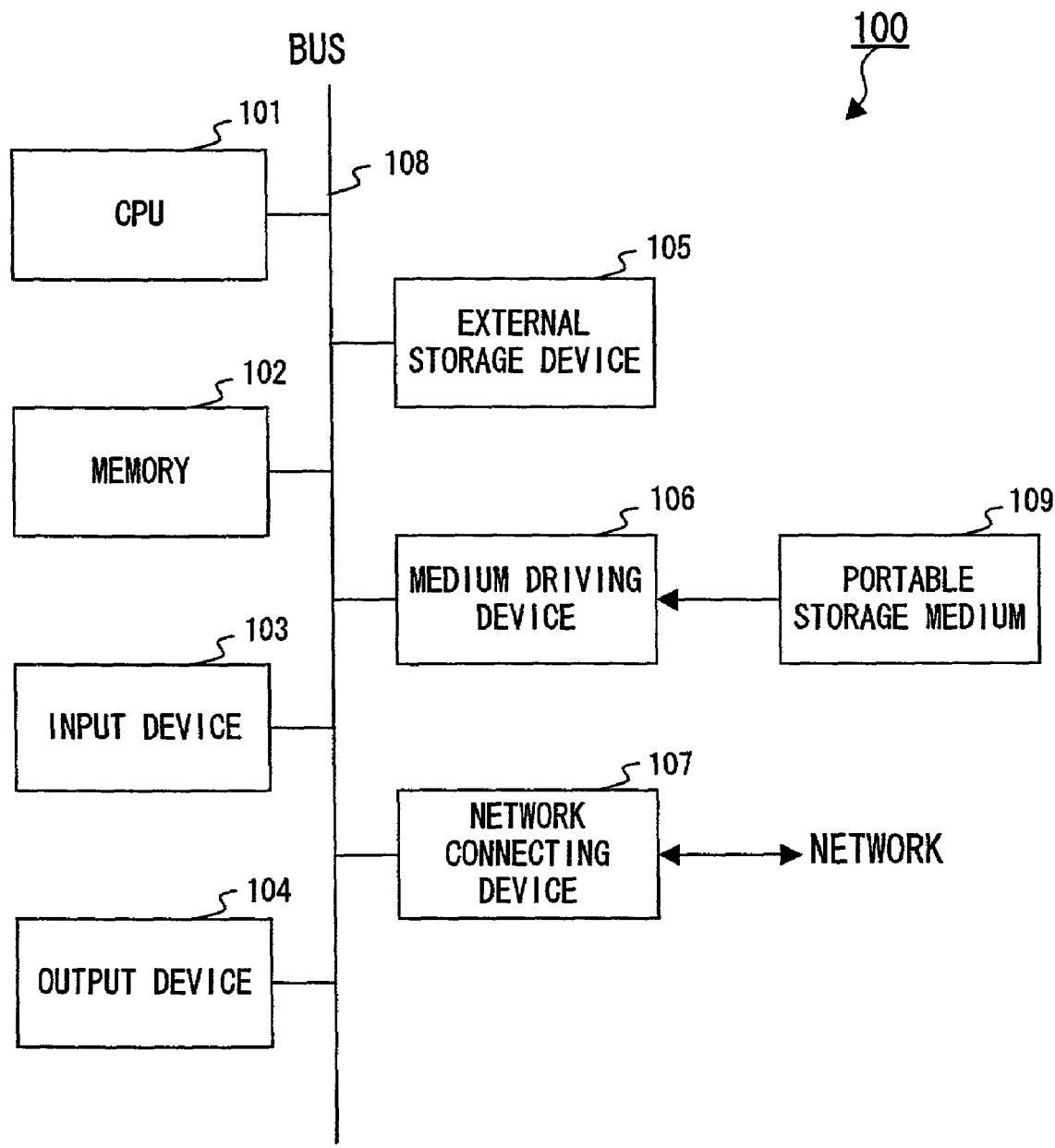
F I G. 16

TOLL ROAD TOLL PAYING METHOD AND APPARATUS USING A PORTABLE TERMINAL, AND A STORAGE MEDIUM THEREOF

BACKGROUND OF THE INVENTION

1. Field of the Invention

The present invention relates to a toll road toll paying method (and apparatus) using a portable terminal.

2. Description of the Related Art

In recent years, systems such as an ETC (Electronic Toll Collection System), which can collect a toll at a tollbooth on a toll road such as a turnpike, etc., nonstop and cashless, have been introduced to relieve traffic jam.

With the ETC, a dedicated terminal (ETC equipment) is mounted on each automobile, and a toll is automatically charged according to a road-car radio communication between an antenna installed at an ETC gate in each tollbooth and the mounted ETC equipment when the automobile passes through the tollbooth.

As described above, the ETC can possibly be of some help for relieving traffic jam. However, the load of purchasing and installing ETC equipment is imposed on a user.

In contrast, conventionally, for example, the invention recited by Japanese Patent Publication No. 11-7562 is proposed. This invention proposes a technique which eliminates the need for arranging the above described dedicated terminal (ETC equipment), and implements a toll collection with a cellular phone whose ownership rate is high.

The ownership rate of a cellular phone is very high at present, and a plurality of cellular phones exist within an automobile in many cases if a plurality of persons are riding in the automobile.

If a plurality of cellular phones exist within an automobile as described above, the above invention recited by Japanese Patent Publication No. 11-7562 has a problem of being unable to cope with the case where a position registration signal is returned from each of a plurality of cellular phones in response to an annunciation signal when the automobile passes through a tollbooth.

Furthermore, if a plurality of persons are riding, for example, a toll is sometimes desired to be shared or split at a desired ratio (for example, 50 to 30 to 20 percent for 3 persons).

SUMMARY OF THE INVENTION

An object of the present invention is to provide a toll road toll paying method, etc., which can pay a toll nonstop and cashless by using a portable terminal, also can cope with the case where a fellow passenger having a portable terminal exists, and can pay a toll by splitting the toll at an arbitrary split ratio.

The toll road toll paying method using a cellular phone according to the present invention comprises: transmitting a signal received from a portable terminal to a server from a dedicated gate arranged at an entry/exit of a toll road; determining whether or not the signal includes a toll road use signal in the server; and charging the toll based on the toll road use signal if the signal includes the toll road use signal.

With the toll road toll paying method, even if a plurality of portable terminals (cellular phones, etc.) exist within an automobile which passes through a gate, a normal signal from a portable terminal can be distinguished from the toll road use signal. Therefore, a toll can be paid nonstop and cashless without any problems by using a portable terminal. The toll road use signal is transmitted from a portable terminal, for example, by invoking a dedicated application. Additionally, for example, charging is made based on user information, etc. included in the toll use signal.

Furthermore, the toll road use signal may include, for example, information about a split toll payer and a payment ratio in addition to user information, and the server may determine the amount of payment of each split toll payer according to a calculated toll and the payment ratio.

As described above, a signal including the information about a split toll payer is transmitted from one cellular phone, so that a split payment of a turnpike toll at a desired ratio can be specified.

As a method enabling a split toll payment at a desired ratio, for example, the following method exists.

Namely, the above described method may further comprise: transmitting each information and information about a gate from the gate to the server, if the toll road use signal including information about a split toll payer, a particular identifier, and a payment ratio is transmitted from a portable terminal; and recognizing that all of split toll payers whose identifiers are the same and a registered user are riding in the same automobile, and determining each payment amount by splitting a toll based on the payment ratio after calculating the toll charged to the automobile in the server.

With this method, each split toll payer transmits information about a split toll payment from his or her portable terminal. At this time, all of persons who are riding in the same automobile set and transmit the same identifier. As a result, on the server side, the persons having the same identifier are recognized as one group, and a toll can be calculated/split in units of groups, even if each of the persons transmits information from his or her portable terminal. A particular identifier is, for example, an automobile identifier.

Additionally, the toll road toll paying method according to the present invention may further comprise: transferring a signal from the dedicated gate arranged at each entry/exit of the toll road to the server if the signal received from the portable terminal includes a toll road use signal; and charging the toll based on the toll road use signal by the server.

As described above, each gate may determine whether or not a signal from a portable terminal includes a toll road use signal, and only a signal including the toll road use signal may be transferred to a server.

Furthermore, the present invention can be implemented as a computer-readable storage medium for causing a computer to execute a process which comprises: determining whether or not a user is pre-registered based on user information and position information, which are transmitted from each gate, if a transmission source is a gate at an entry; and permitting passage and recording a use start point if the user is pre-registered as a result of the determination, and verifying the user and calculating a toll based on a use end point, the recorded use start point, and a pre-stored toll table if the transmission source is a gate at an exit.

BRIEF DESCRIPTION OF THE DRAWINGS

FIG. 8 exemplifies a process performed in the case where only a user pays a toll (at an entry);

FIG. 12A shows a specific example of the user master;

FIG. 12B shows a specific example of the toll master;

FIGS. 14A to 14C exemplify a display screen (including a different pattern) of a cellular phone;

FIGS. 15A to 15C shows the state of recording information items to a use journal according to the specific examples shown in FIGS. 12 to 14;

FIG. 16 exemplifies the hardware configuration of a computer rendering the nonstop turnpike service.

DESCRIPTION OF THE PREFERRED EMBODIMENTS

Preferred embodiments according to the present invention are described below with reference to the drawings.

Figure 1:
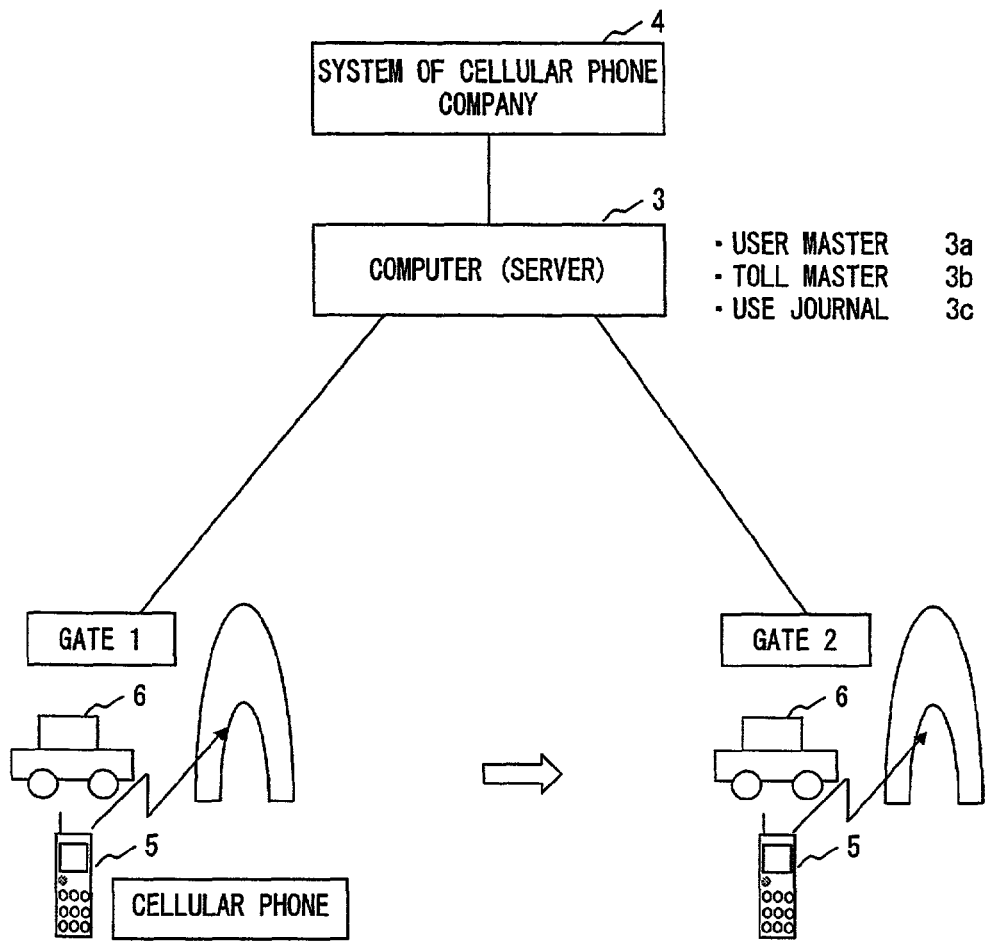
FIG. 1 roughly shows an entire system implementing a toll road toll paying method using a cellular phone according to a preferred embodiment.

FIG. 1 roughly shows an entire system implementing a toll road toll paying method using a cellular phone according to one preferred embodiment.

The following preferred embodiment is described by taking a turnpike as an example of a toll road. However, the present invention is not limited to a turnpike.

The system according to this preferred embodiment comprises each dedicated gate in all of tollbooths on a turnpike. Here, explanation is provided by assuming that a gate at an entry and a gate at an exit are respectively gates 1 and 2. Additionally, the gates 1 and 2 are connected to a computer 3 (server) via a network (such as a dedicated line of some type or other).

Each of the gates 1 and 2 comprises a function that can radio communicate with a cellular phone 5.

The computer 3 holds a pre-registered user master 3a, and a toll master 3b. If a user registered to the user master 3a actually uses a turnpike, the computer 3 generates a user journal 3c. Additionally, the computer 3 is connected to a system 4 of a cellular phone company via a network, and requests the system 4 to collect a turnpike toll as a proxy based on the generated user journal 3C. Furthermore, the computer 3 makes a connection to a cellular phone network, and transmits/receives e-mail to/from the cellular phone 5 of the user of the turnpike, although this is not particularly shown in FIG. 1. Its details will be described later.

Before an automobile 6 ridden by the user passes through the gate 1 at the entry of the turnpike, the user invokes a particular application (hereinafter referred to as a turnpike use application) preinstalled in a cellular phone 6 (if a plurality of persons are riding, a cellular phone 5 of any of the persons are invoked). When the automobile 6 passes through the gate 1 in this state, the gate 1 and the computer 3 execute processes to be described in detail later based on a particular return signal (hereinafter referred to as a use notification signal) returned from the cellular phone 5 in which the turnpike use application is invoked, and confirm the user and the use start point. Also at an exit, the gate 2 and the computer 3 verify the user, confirm the use end point, and determine a toll (a split toll paid by each of a plurality of persons if the toll is paid by the plurality of persons) by executing processes to be described in detail later.

Figure 2A:
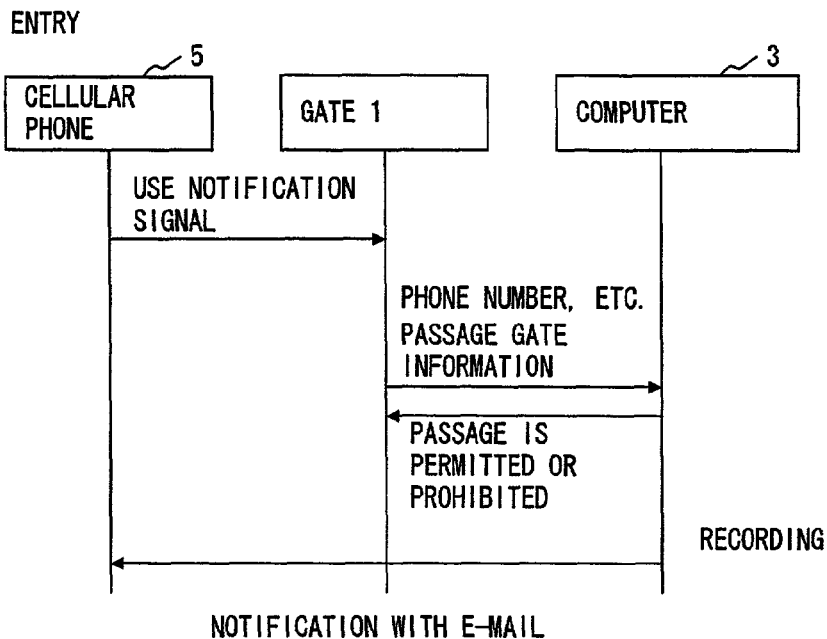
FIG. 2A shows the outline of a procedure performed at an entry of a turnpike.
Figure 2B:
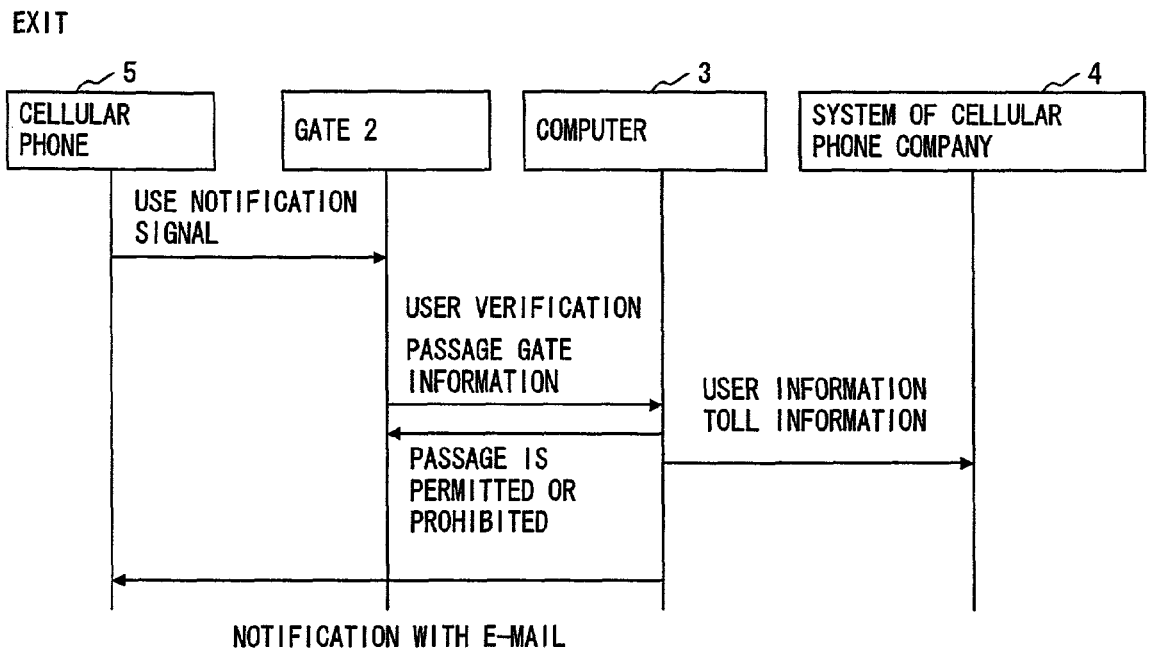
FIG. 2B shows the outline of a procedure performed at an exit of a turnpike.

The outlines of the process procedures at an entry/exit are shown in FIGS. 2A and 2B.

FIG. 2A shows the outline of the process procedure at the entry.

Upon receipt of the use notification signal from the cellular phone 5 in which the turnpike use application is invoked, the gate 1 at the entry transmits user information (a cellular phone number, etc.), passage gate information (use start point), etc. to the computer 3. The computer 3 determines whether to permit or to prohibit the passage of the automobile of the user based on the user master 3a. If the computer 3 determines to prohibit the passage, it notifies the gate 1 at the transmission source to prohibit the passage of the gate 1. Or, if the computer 3 determines to permit the passage, it records this information to the use journal 3c. Furthermore, the computer 3 transmits e-mail to a cellular phone of a split toll payer to be described later, and makes the payer verify/acknowledge the payment. Its details will be described later.

FIG. 2B shows the outline of the process procedure performed at the exit.

Upon receipt of a use notification signal from the cellular phone 5 in which the turnpike use application is invoked, the gate 2 transmits user information (a cellular phone number, etc.), passage gate information (use end point) etc., to the computer 3, similar to the gate 1 at the entry. The computer 3 determines whether to permit or to prohibit the passage based on the user master 3a. If the computer 3 determines to prohibit the passage, it notifies the gate 2 at the transmission source. Or, if the computer 3 determines to permit the passage, it completes the use journal 3c, notifies the system 4 of the cellular phone company of the user information and the toll information, and requests the system 4 to collect the toll as a proxy. Furthermore, the computer 3 notifies the cellular phone 5 of each user of the toll collection. Its details will be described later.

Note that an antenna with high directivity for a radio wave from downward may be arranged at the top of the gates 1 and 2.

The above described method is merely one example. For instance, the gates 1 and 2 may transfer a signal from a cellular phone to the computer 3, and the computer 3 may determine whether or not the signal is a user notification signal.

Furthermore, this preferred embodiment adopts a cellular phone. However, this is merely one example, and a different portable terminal may be utilized.

Figure 3:
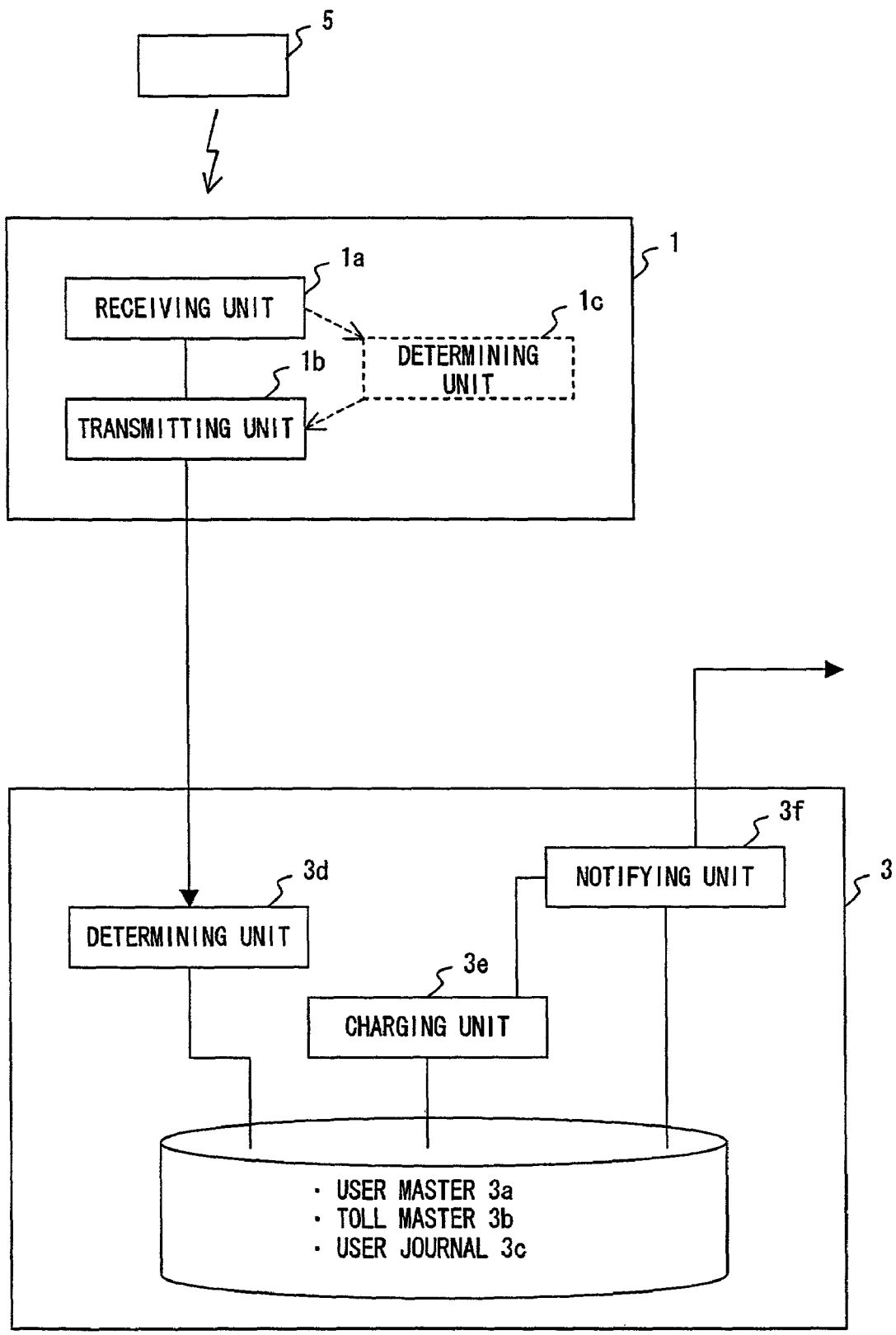
FIG. 3 is a block diagram showing the functions of the gate and the computer (server).

FIG. 3 is a block diagram showing the functions of the above described gate 1 (or the gate 2) and the computer 3 (server).

This figure takes the gate 1 as an example. However, also the gate 2 has a similar configuration.

The functions of the gate 1 (or the gate 2) and the computer 3 (server) are briefly described below with reference to FIG. 3, and their details will be described with reference to FIG. 4 and subsequent drawings.

The gate 1 comprises a receiving unit 1a receiving a signal from the cellular phone 5, and a transmitting unit 1b transferring the signal received by the receiving unit 1a to the computer 3 (server) along with position information (prerecorded to a storing unit not shown) of the gate 1 itself.

The computer 3 (server) comprises a determining unit 3d, a charging unit 3e, and a notifying unit 3f.

The determining unit 3d first determines whether or not the signal received by the receiving unit 1a includes turnpike use determination information to be described later, based on the data (the signal received by the receiving unit 1a and the position information of the gate 1 itself) transmitted from the transmitting unit 1b. If the determining unit 3 determines that the turnpike use determination information is not included, it instructs the gate 1 not to pass an automobile, in which the owner of the cellular phone 5 is riding, through the gate 1.

If the determining unit 3d determines that the turnpike use determination information is included, it further checks whether or not the owner of the cellular phone 5 is a pre-registered person by searching for the user master 3a with the use of user information included in the signal received by the receiving unit 1a. If the determining unit 3d determines that the owner is not a pre-registered person, it instructs the gate 1 not to pass the automobile, in which the owner of the cellular phone 5 is riding, through the gate 1.

When the checks by the determining unit 3d are properly terminated, a use journal 3c for this user is generated based on the user information and the position information. After the checks by the determining unit 3d are made also for the gate 2 at the exit in a similar manner, the use journal 3c is completed.

The charging unit 3e charges a toll based on the use journal 3c and the toll master 3b.

Furthermore, if a split toll payment is made, the signal from the cellular phone 5 includes information about a split toll payer and a payment ratio in addition to the user information. In this case, the charging unit 3e determines the respective amounts of payment of the user and the split toll payer according to a calculated toll and the payment ratio, when charging the toll.

Or, a split toll payment may be made with another method.

For example, if a split toll payment is desired to be made, the signal from the cellular phone 5 may include the information about a split toll payer, a particular identifier, and a payment ratio in addition to user information. In this case, the charging unit 3e recognizes all of the split toll payer and the pre-registered user, whose particular identifiers are the same, to ride in the same automobile, splits a toll for the automobile based on the payment ratio after calculating the toll, and determines the respective amounts of payment, when charging the toll.

If a split toll payment is made, the notifying unit 3f transmits e-mail for verifying/acknowledging the toll payment and the payment ratio of a turnpike to the cellular phone of each split toll payer.

Additionally, the present invention is not limited to the above described configuration, and the gate 1 may further comprise a determining unit 1c. The determining unit 1c determines whether or not a signal received by the receiving unit 1a includes turnpike use determination information to be described later. In this configuration, the transmitting unit 1b transfers to the computer 3 (server) only a signal that the determining unit 1c determines to include the turnpike use determination information. Furthermore, in this configuration, the function for determining whether or not the signal received by the receiving unit 1a includes the turnpike use determination information becomes unnecessary among the functions of the determining unit 3d.

The functions of the gate 1 and the computer 3 are briefly described above. Their details are described below.

Figures 4A, 4B, 4C:
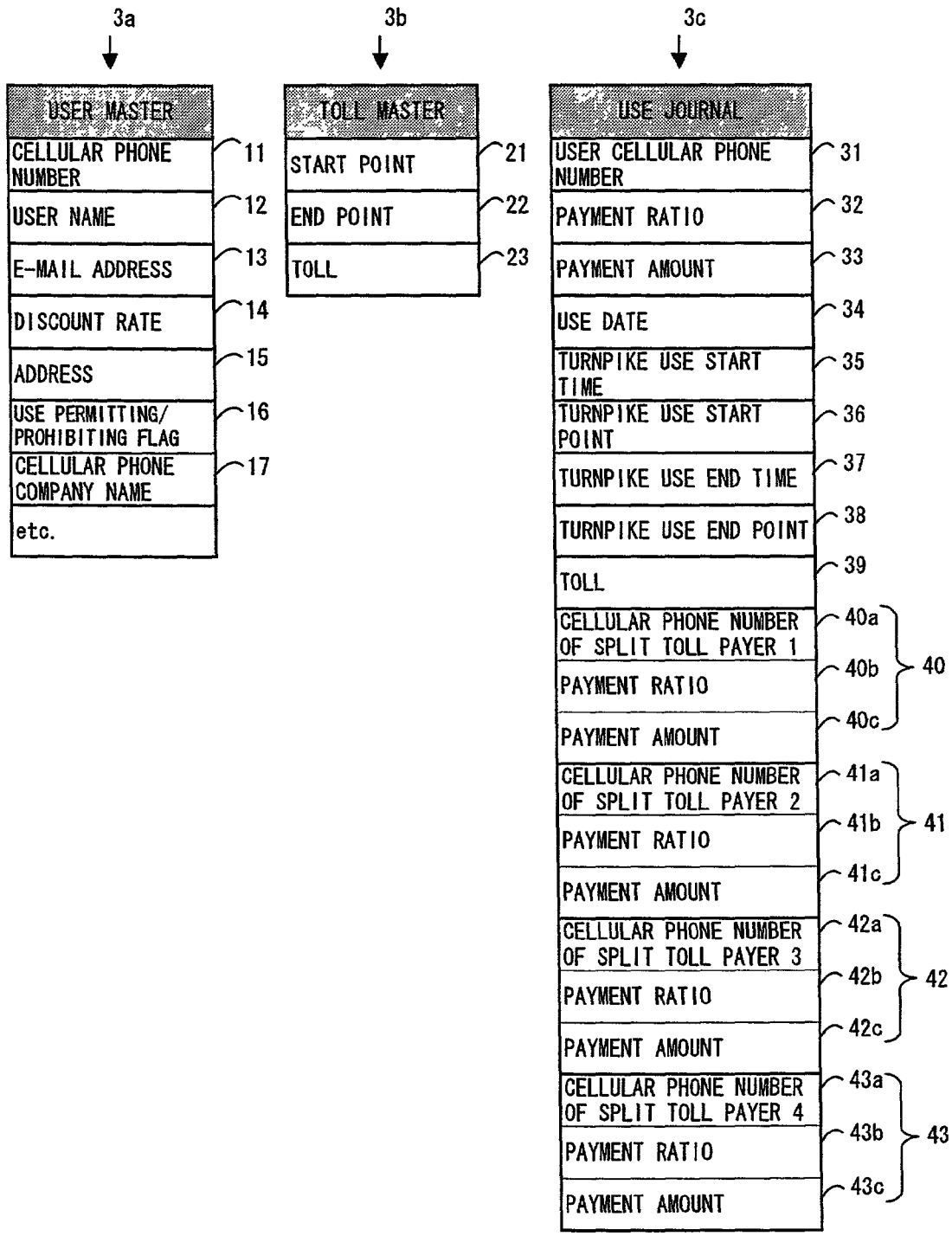
FIG. 4A shows a specific example of a user master.
FIG. 4B shows a specific example of a toll master
FIG. 4C shows a specific example of a use journal.
Figure 5:
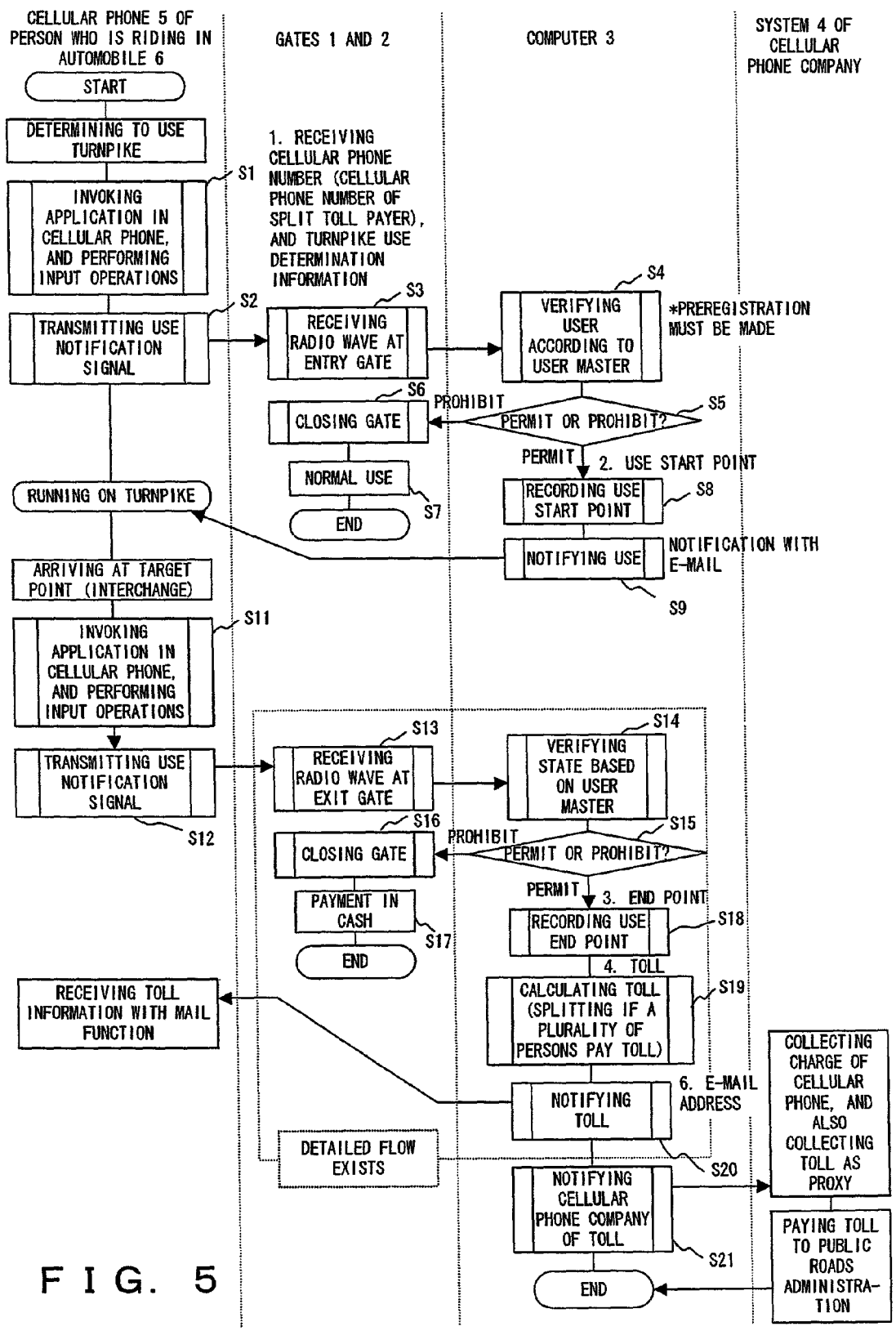
FIG. 5 is a flowchart showing the entire process implementing a nonstop turnpike service according to the preferred embodiment.
Figure 7:
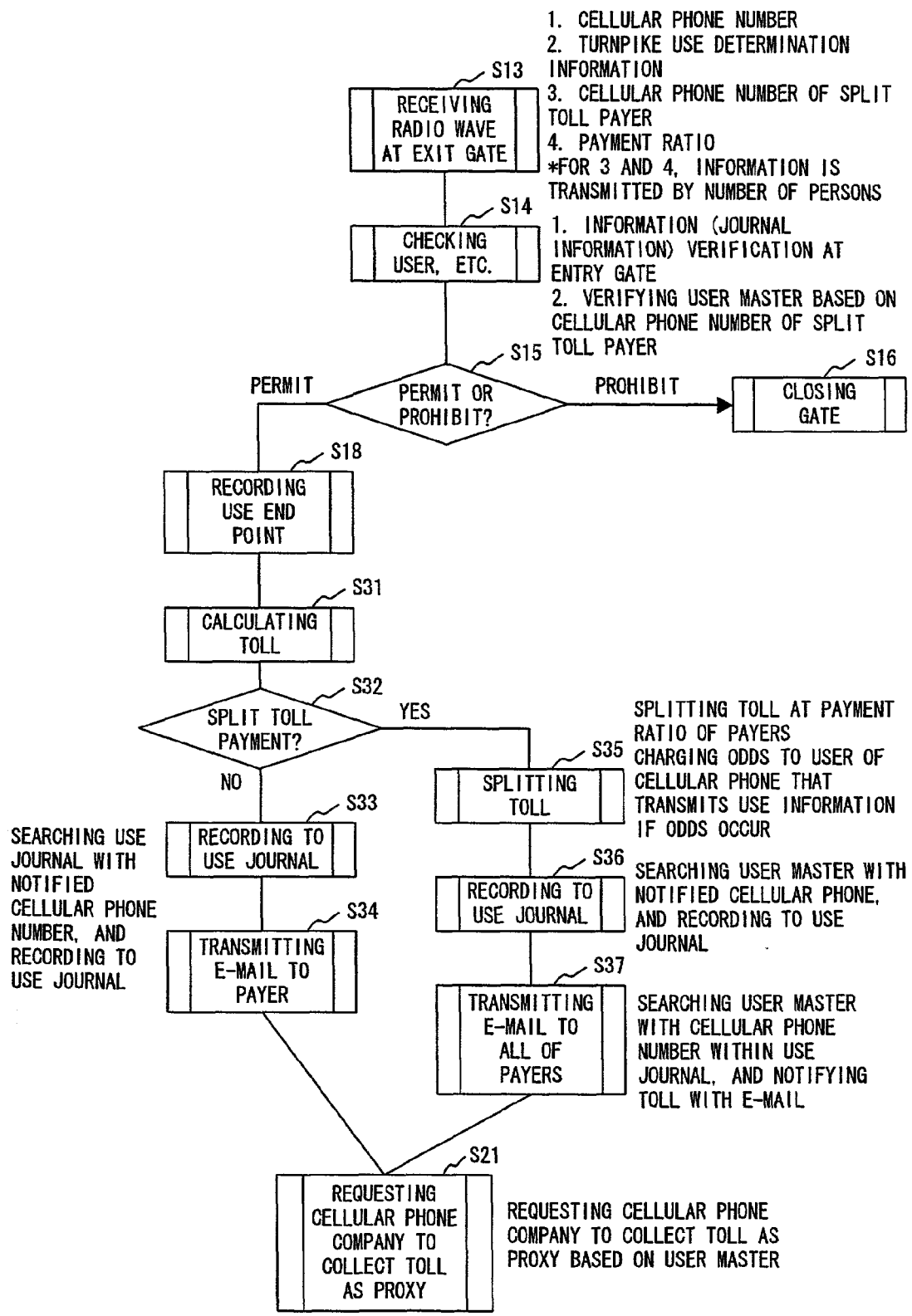
FIG. 7 is a flowchart mainly explaining the details of the operations of a computer when a user passes through an exit.

Flowcharts representing the above described processes are shown in FIGS. 5 and 7. Prior to its explanation, specific examples of the above described user master 3a, toll master 3b, and use journal 3c are described with reference to FIGS. 4A to 4C.

FIG. 4A shows a specific example of the user master 3a.

The user master 3a shown in this figure stores, for each pre-registered user, information about a cellular phone number 11, a user name 12, an e-mail address 13, a discount rate 14, an address 15, a use permitting/prohibiting flag 16, a cellular phone company name 17, etc. As the discount rate 14, an arbitrary discount rate is stored if some discount service or other (such as a highway-card, etc.) is applied.

The toll master 3b stores a start point 21, an end point 22 (an interchange name, etc.), and a toll 23 between the start point 21 and the end point 22 for all of combinations of tollbooths, as in a generally known turnpike toll table.

The use journal 3c includes data items such as a user cellular phone number 31, a payment ratio 32, a payment amount 33, a use date 34, a turnpike use start time 35, a turnpike use start point 36, a turnpike use end time 37, a turnpike use end point 38, and a toll 39. As will be described in detail later, data according to use contents are recorded to these data items in an actual use of a turnpike. Furthermore, information of up to 4 split toll payers 40, 41, 42, and 43 are recorded to cope with the case where a plurality of persons pay a split toll. Each of the split toll payer information 40, 41, 42, and 43 is composed of a cellular phone number 40a, 41a, 42a, or 43a, a payment ratio 40b, 41b, 42b, or 43b, and a payment amount 40c, 41c, 42c, or 43c of each of the split toll payers.

If only a user pays a toll, the payment ratio 32 results in 100 percent, and the toll 39 becomes the payment amount 33 unchanged.

Details of the above described process are described below mainly with reference to FIGS. 5 and 7.

Figure 9:
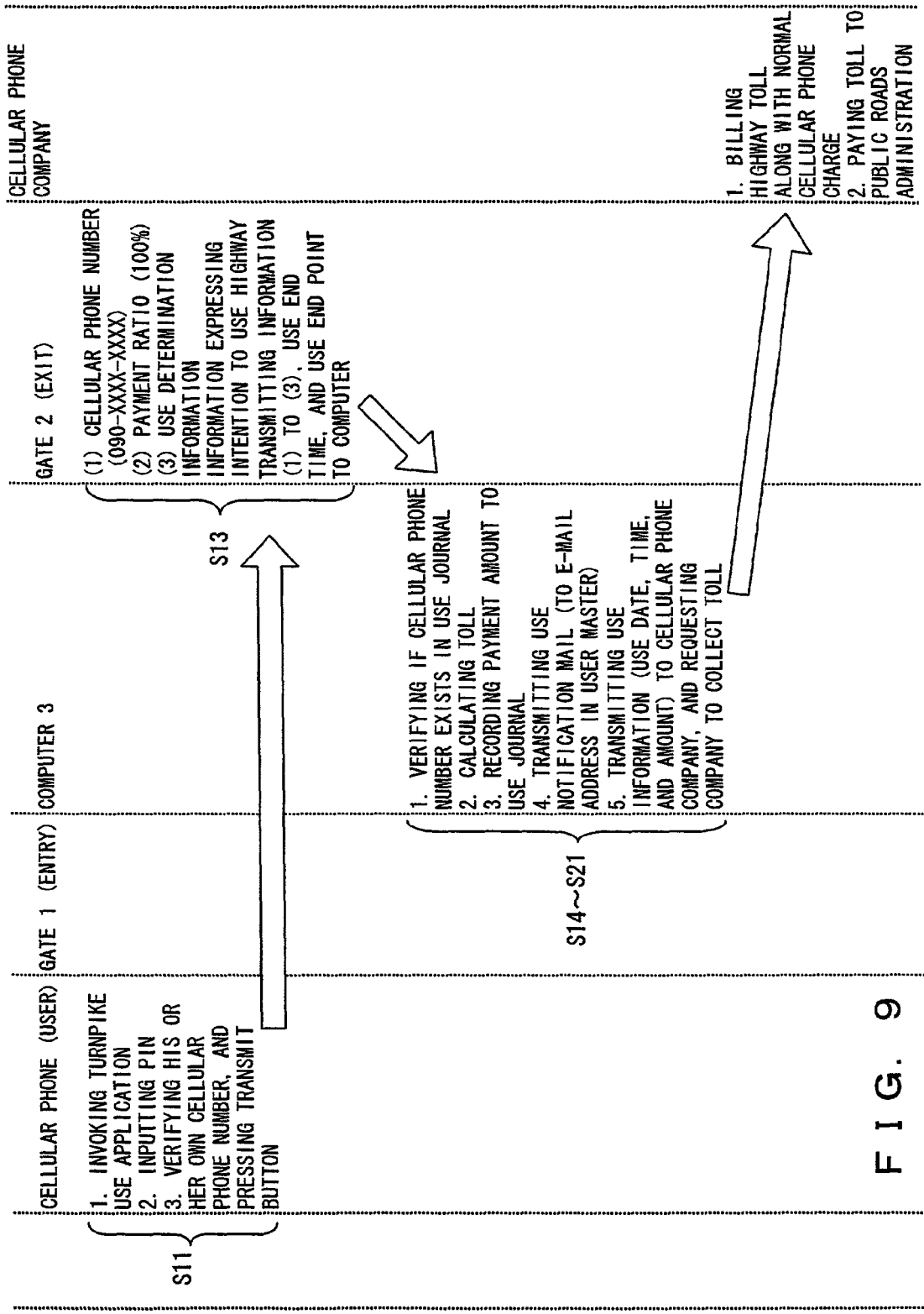
FIG. 9 exemplifies a process performed in the case where only a user pays a toll (at an exit)
Figure 10:
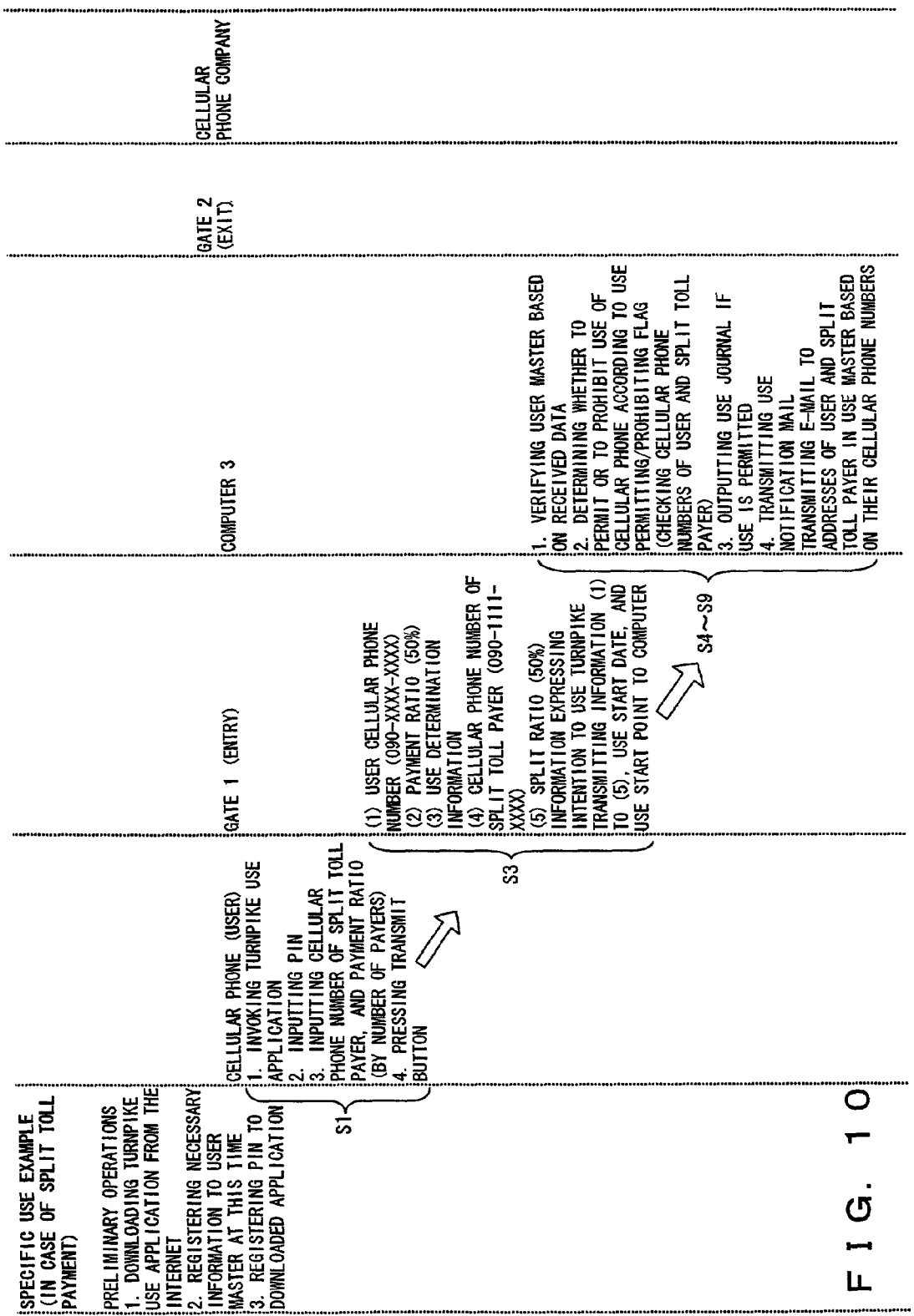
FIG. 10 exemplifies a process performed in the case where a plurality of persons (a user and another person) make a split toll payment (at an entry)
Figure 11:
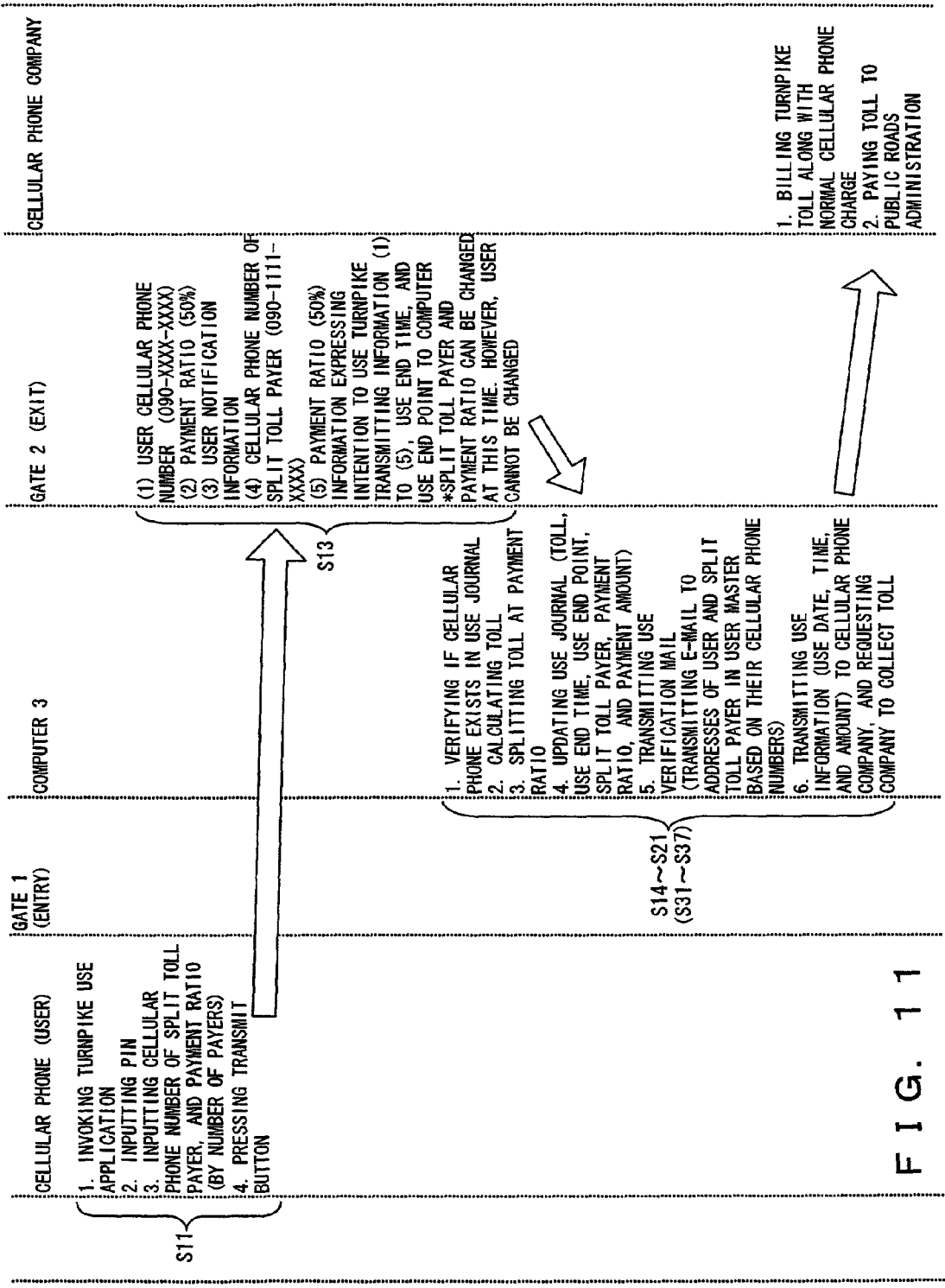
FIG. 11 exemplifies a process performed in the case where a plurality of persons (a user and another person) make a split toll payment at an exit)

FIG. 5 is a flowchart showing the process performed by an entire system implementing a nonstop turnpike service according to this preferred embodiment. FIG. 7 is a flowchart mainly explaining the details of the process performed by a computer 3 when a user passes through an exit. FIGS. 8 and 9 exemplify the process of FIG. 5, which is performed when only a user pays a toll (FIG. 8 shows the process at an entry, whereas FIG. 9 shows the process at an exit). FIGS. 10 and 11 exemplify the process of FIG. 5, which is performed when a plurality of persons (a user and another person) pay a split toll (FIG. 10 shows the process at an entry, whereas FIG. 11 shows the process at an exit).

As preliminary operations, the turnpike use application is downloaded into a cellular phone, and the contents of the user master 3a and a PIN are registered on an initial registration screen not shown.

First of all, if the user who is riding an automobile 6 (any of a plurality of persons if the plurality of persons are riding) determines to use a turnpike, he or she invokes the turnpike use application which is downloaded into his or her cellular phone in advance, and performs input operations described below (step S1).

Figure 6A:
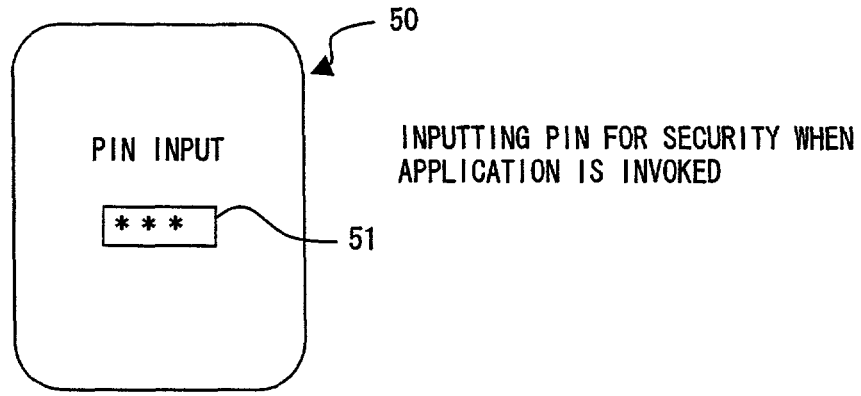
FIG. 6A exemplifies a screen (PIN input screen) at the time of invocation.

When the application is invoked, it first displays a PIN input screen 50 shown in FIG. 6A for security, and makes the user input his or her PIN in a PIN input field 51. Only if a correct PIN is input, the display shifts to a payer setting screen 60 shown in FIG. 6B. Note that a user presets a PIN at the time of initial registration. With these operations, the cellular phone 5 is not abused, for example, if it is lost.

Figure 6B:
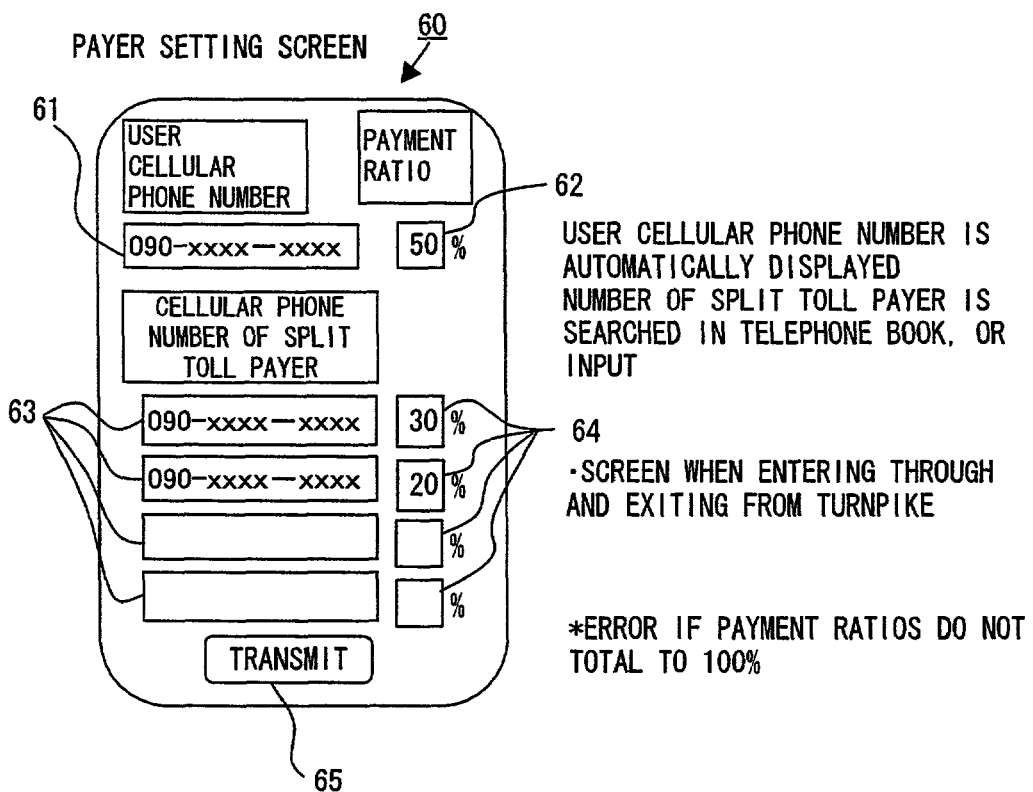
FIG. 6B exemplifies a payer setting screen.

The user performs desired input operations on the payer setting screen 60 shown in FIG. 6B. The payer setting screen 60 displays an input field 61 for a user cellular phone number, an input field 62 for a user payment ratio, an input field 63 for a cellular phone number of a split toll payer, an input field 64 for a payment ratio 64 of up to 4 persons (information of 2 persons are input in the example shown in FIG. 6B), and a Transmit button 65.

A cellular phone number of a user is automatically set/displayed in the input field 61. If only the user pays a toll, it is sufficient that he or she only presses the transmit button 65 as shown in FIG. 6 (the payment ratio of the user automatically results in 100 percent).

In the meantime, if a plurality of persons split and pay a toll, the cellular phone number of each of the plurality of persons is input to the input field 63, and an arbitrary payment ratio is input to the input field 64 as shown in FIG. 10. Normally, not a few cases exist where the cellular phone number of a person who is riding an automobile is registered to a telephone book. Therefore, a function for automatically inputting a cellular phone number to the input field 63 if a selection/specification is made in the telephone book may be added to the above described application, thereby reducing the troublesomeness of the input operations. Upon completion of the input operations, the user presses the Transmit button 65. At this time, the application determines whether or not all of payment ratios total to 100 percent. If they do not total to 100 percent, the application determines this payment ratio input as an error.

The cellular phone 5 returns a particular signal (the above described use notification signal), which is different from a normal cellular phone signal, in response to an annunciation signal with the function of the turnpike use application, after the Transmit button 65 is pressed (step S2).

Each of the gates 1 and 2 performs a process for transmitting an annunciation signal and for receiving a return signal from the cellular phone 5 as occasion demands, similar to a wireless base station of a normal cellular phone. However, if the return signal from the cellular phone 5 is a normal position registration signal that is returned from a cellular phone, it is ignored. In the meantime, the cellular phone 5, in which the turnpike use application is invoked and from which predetermined settings/inputs are made, returns the return signal (the above described use notification signal) including the information expressing the intention to use a turnpike (any information is available if it is predetermined; and this information is hereinafter referred to as turnpike use determination information), and information about a user/a split toll payer in response to the annunciation signal by performing the operation in step S2. If the received signal includes the turnpike use determination information, each of the gates 1 and 2 determines that this signal is a signal for using a turnpike, and performs the process described below.

As stated earlier, the above described method is merely one example, and the present invention is not limited to this implementation. For example, the gate 1 or 2 may transfer a signal from a cellular phone to the computer 3, and the computer 3 may determine whether or not this signal is a signal for using a turnpike.

If the gate 1 determines that the use notification signal is received, it transmits the information (such as a cellular phone number, a payment ratio, etc.) about a user/a split toll payer, which is included in the received signal, to the computer 3 along with the information (use start point) of the gate 1 itself (step S3). The information transmitted is exemplified in FIGS. 8 and 10.

The computer 3 verifies whether or not the user/the split toll payer is pre-registered and can use this service by searching the user master 3a based on the data (the information about the user/the split toll payer, etc.) transmitted in step S3, and whether to permit or to prohibit the use of this service (step S4), and determines whether to permit or to prohibit the passage (step S5). For example, in the case shown in FIG. 8, the computer 3 determines to permit the passage, if the user is registered to the user master 3a, and if the use permitting/prohibiting flag is ON (permitting the use). In the meantime, in the case shown in FIG. 10, the computer 3 determines to permit the passage if the user and all of the split toll payers are pre-registered to the user master 3a, and if the use permitting/prohibiting flag is ON (permitting the use).

Whether or not the user and all of the split toll payers are pre-registered is determined, for example, by judging if the cellular phone numbers of the user/the split toll payers are included in the data transmitted in step S3, and by judging if these cellular phone numbers are registered to the user master 3a. Normally, the use permitting/prohibiting flag is set to ON (permitting the use). However, this flag is set to OFF in cases such as the case where the user utilizes this service and has not paid the toll yet, the case where the user lost his or her cellular phone, and submitted the report of the loss, or the like.

If the computer 3 determines to prohibit the passage ("prohibit" in step S5), the computer 3 notifies the gate 1 of this information. Upon receipt of this information, the gate 1 prevents the automobile 6 from passing through, for example, by closing the gate itself (step S6), and prompts the automobile 6 to use a different general gate (step S7). Conversely, the gate may be normally closed, and opened only if the computer 3 determines to permit the passage and notifies the gate 1 of this information.

As described above, even if a user who is not pre-registered to the user master 3a invokes the turnpike use application, he or she cannot use this system. Furthermore, if a split toll payment is made, also a split toll payer must be pre-registered (otherwise, a request to make a cellular phone company collect a toll as a proxy cannot be made).

In the meantime, if the computer 3 determines to permit the passage, it records the information about the gate (use start point), the information about the user/the split toll payers, and the like to the use journal 3c of this user (step S8). At this time point, the user cellular phone number 31, the payment ratio 32, the use date 34, the turnpike use start time 35, and the turnpike use start point 36 within the use journal 3c are recorded. Furthermore, if a split toll payment is made, the cellular phone number 40a, 41a, 42a, or 43a, and the payment ratio 40b, 41b, 42b, or 43b within each split toll payer information 40, 41, 42, and 43 are recorded by the number of split toll payers.

If the computer 3 determines to permit the passage, the automobile 6 of the user passes through the gate 1 and runs on the turnpike. Normally, a cellular phone (a call, and e-mail transmission/reception) can be used during running on a turnpike. Therefore, the computer 3 automatically generates e-mail for verifying the use of a turnpike and the payment ratio based on the user master 3a and the use journal 3c, and transmits the e-mail to the cellular phone of the user (also to a cellular phone of a split toll payer if a toll is split and paid as shown in FIG. 10 via a cellular phone network, etc. (step S9).

When the automobile 6 of the user arrives at a target interchange, the turnpike use application is invoked in the cellular phone 5 of the user prior to the passage of the gate 2 at the exit, and necessary input operations are performed in a similar manner as in the case of the gate 1 at the entry (step S11). Notice that the contents set/input in step S1 are preserved. Accordingly, there is no need to again set/input contents if no change is made. It is sufficient to only press the Transmit button 65.

In this way, the cellular phone 5 of the user returns a use notification signal in response to the annunciation signal from the gate 2 in a similar manner as in step S2 (step S12). If the gate 2 determines that the received signal is a use notification signal, it transmits the information about the user (such as a telephone number, etc.), which is included in this signal, to the computer 3 along with the information (use end point) of the gate 2 itself in a similar manner as in step S3 (step S13).

Then, the computer 3 performs a user verification process, which will be explained in detail with reference to FIG. 7, based on the data (the information about the user, etc.) transmitted in step S13, and the use journal 3c (and the user master 3a if necessary) (step S14), and determines whether to permit or to prohibit the passage (step S15). If the computer 3 determines to prohibit the passage ("prohibit" in step S15), it notifies the gate 2 of this information. Upon receipt of this information, the gate 2 prohibits the automobile 6 from passing through, for example, by closing the gate itself (step S16), and prompts the user to pay the toll in cash by using a different general gate (step S17), for example, by voice/display, etc.

In the meantime, if the computer 3 determines to permit the passage, it records the information about the use end point to the turnpike use end time 37, and the turnpike use end point 38 within the use journal 3c (step S18).

Additionally, the computer 3 calculates a turnpike toll based on the use journal 3c and the toll master 3b, as will be described in detail with reference to FIG. 7, and obtains a split toll of each person if the toll is split and paid (step S19). The computer 3 then records the split toll to the use journal 3c. As a result, the use journal 3c has been generated. Additionally, the computer 3 notifies the cellular phone of each person of the toll to be paid (payment amount), etc. via e-mail (step S20).

Furthermore, the computer 3 notifies the system 4 of the cellular phone company of the information (such as a toll to be paid (payment amount), a cellular phone number, a use date and time, etc. of each person) required to request a proxy collection of the toll based on the use journal 3c that has been generated, and the user master 3a (step S21).

The cellular phone company already renders a proxy collection service for an arbitrary charge when collecting a cellular phone charge. Therefore, the cellular phone company may be made to collect a turnpike toll as a proxy.

FIG. 7 is a flowchart explaining the details of the operations performed in the above described steps S13 to S20.

In this figure, steps S31 to S37 are shown as a flow of the details of the operations performed in steps S19 and S20 in FIG. 5, and the other operations are denoted with the same step numbers.

Firstly, the use notification signal that the gate 2 at the exit receives in the above described step S13 includes the cellular phone number of the user (cellular phone numbers and the payment ratio of all of split toll payers if a toll is split and paid), and the turnpike use determination information. As stated earlier, the turnpike use determination information may be arbitrarily predetermined on the provider side of this service, and automatically included in a return signal when the turnpike use application is invoked.

Upon receipt of the use notification signal (whether or not the received signal is a use notification signal is determined depending on whether or not the received signal includes the turnpike use determination information), the gate 2 transmits the above described data of various types included in the use notification signal to the computer 3.

In step S14, the computer 3 searches the use journal 3c that has been generated when the user passes through the gate 1 at the entry. Namely, the use journal 3c whose user cellular phone number 31 matches the cellular phone number of the user is searched. If the corresponding use journal 3c is not found, the computer 3 determines to prohibit the passage. If the corresponding use journal 3 is found, whether or not the data transmitted from the gate 2 matches the contents of the found use journal 3c is determined. If they match, the computer 3 determines to permit the passage. (Since checks are made when the user passes through the entry, there is no need to again verify the user with the user master 3a). If the split toll payer is changed, it is determined whether or not the split toll payer within the data transmitted from the gate 2 is a person pre-registered to the user master 3a, and whether or not the use permitting/prohibiting flag is ON. If the user is pre-registered to the user master 3a, and if the flag indicates the permission of the use, the computer 3 changes the split toll payer information 40 to 43 (by the number of split toll payers) within the use journal 3c, and determines to permit the passage. Otherwise, the computer 3 determines to prohibit the passage.

Namely, this process assumes that a split toll payer (and/or a payment ratio) may be changed (the split toll payer must be a person who is pre-registered and permitted to pass), but a cellular phone number of a user must be the same as that registered when passing through the gate 1 at the entry (the turnpike use application must be invoked in the same cellular phone). If the passage is permitted as a result of the checks made in the operation of step S14 ("permit" in step S15), a use end time and a use end point are recorded to the turnpike use end time 37 and the turnpike use end point 38 within the use journal 3c (step S18).

Then, a toll is obtained by searching the toll master 3b based on the turnpike use start point 36 and the turnpike use end point 38, and the obtained toll is recorded to the toll 39 (step S31).

Next, whether or not the payment method is a split toll payment is determined (step S32).

If only the user pays a toll ("NO" in step S32), the computer 3 records the toll 39 as the payment amount 33 unchanged as shown in FIG. 9 (step S33), automatically generates e-mail for verification, whose destination is the e-mail address 13 and whose body includes the payment amount, etc., and transmits the e-mail (step S34). Lastly, the operation of the step S21 is performed, and this process is terminated.

In the meantime, if a plurality of persons pay the toll ("YES" in step S32), the computer 3 obtains the payment amount of each of the plurality of persons by splitting the toll 39 at the payment ratio 32 and 40b to 43b (by the number of payers) (step S35), and records the obtained payment amounts to the payment amount 33, and 40c to 43c (by the number of payers) (step S36).

If the toll cannot be divided and odds occur, for example, the odds are added to the payment amount 33 of the user. Here, the use journal 3c has been generated.

Then, the computer 3 searches the user master 3a by using as a key the user cellular phone number 31, and the split toll payer cellular phone numbers 40a to 43a (by the number of payers), obtains e-mail address 13 of each of the payers, automatically generates e-mail for verification, whose destination is the e-mail address 13 and whose body includes the payment amount, etc., and transmits the e-mail (step S37). Lastly, the operation of the step S21 is performed. Here, the process is terminated.

The above described process is explained below by taking a specific example.

FIG. 12A shows a specific example of the user master 3a.

Note that the user master 70 shown in FIG. 12a is represented by omitting some items (an address, a discount rate, etc.) from the user master 3a shown in FIG. 4A.

The specific example provided below assumes that 3 persons such as "Yamauchi", "Hirajima", and "Okada" are riding in a certain automobile 6, and all of the 3 persons are pre-registered to the user master 3a.

The user master 70 shown in FIG. 12A exemplifies the registration information of the above 3 persons "Yamauchi", "Hirajima", and "Okada" among the information of many registered persons within the user master 3a. In the example shown in FIG. 12A, "090000OOOO", and "Sapporo あ0oΔx" are respectively registered to the cellular phone number 72 and the automobile identifier 75 for the user name 71="Yamauchi". Also for "Okada", registrations are made to the cellular phone number 72, the e-mail address 73, and the automobile identifier 75. Additionally, the user permitting/prohibiting flag 74 is assumed to be ON (permitting the use) for all of the 3 persons. (As far as no problems occur, the flag is normally set to ON as described above.)

Here, the automobile identifier 75 is explained. The above provided explanation does not refer to the automobile identifier. The automobile identifier is used in a preferred embodiment different from the above described preferred embodiment. In the above described preferred embodiment, for example, as shown in FIG. 6B, also split toll payers other than a user, and their payment ratio are set/input by using only one of a plurality of cellular phones. However, in this different (second) preferred embodiment, each of split toll payers invokes the above described application to display, for example, a split toll payer setting screen in his or her cellular phone prior to the passage of a gate, and sets/inputs on this screen the automobile identifier (a number on a number plate, etc.) of the automobile in which the payer is currently riding, a payment ratio, etc. In this way, even if the payers respectively transmit data, the computer 3 side can determine that the persons having the same automobile identifier are riding in the same automobile. In the example shown in FIG. 12A, the number on the number plate of the automobile is used as an automobile identifier. However, the automobile identifier is not limited to this one, and any information is available as far as an automobile can be identified with the information.

Note that an automobile identifier (a number on a number plate, etc.) of an automobile that each person possesses is fundamentally registered as the automobile identifier 75 of the user master 70.

FIG. 12B shows a specific example of the toll master 3b.

As represented by the toll master 80 shown in this figure, interchange names (Sapporo, Hidaka, and Abashiri) of a turnpike, and tolls between the interchanges are stored, similar to a generally known turnpike toll table. The tolls are stored separately for large and ordinary cars. By way of example, the toll between Sapporo and Abashiri is 10,000 yen for an ordinary car.

FIGS. 13A to 13D, and 14A to 14C exemplify a cellular phone screen when the above described application is used. Especially, FIGS. 14B and 14C exemplify a screen corresponding to the different preferred embodiment.

Figure 13A:
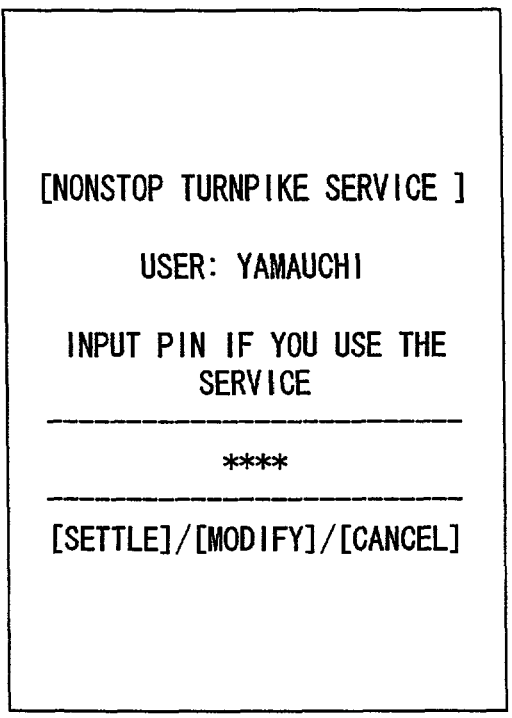
FIGS. 13A to 13D exemplify a display screen of a cellular phone.
Figure 13B:
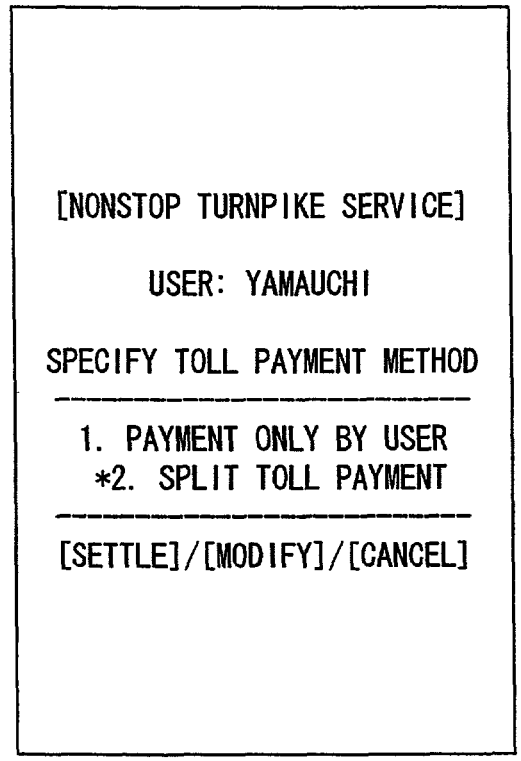
Figure 13C:
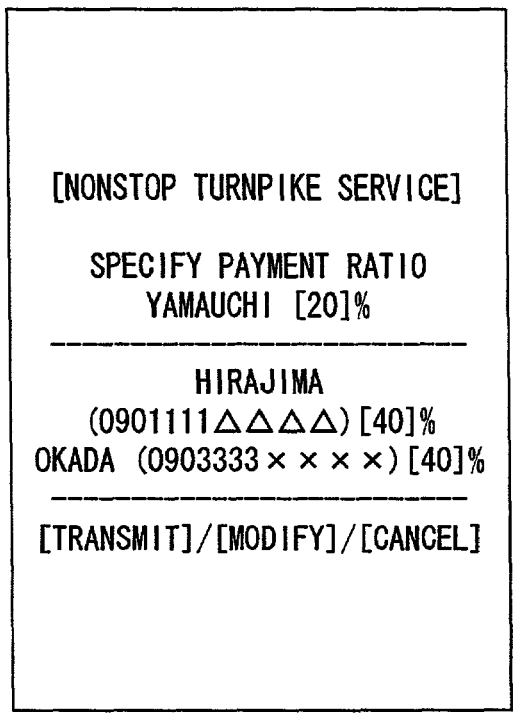

Assume that "Yamauchi" invokes the turnpike use application in his cellular phone. When the application is invoked, the screen of FIG. 13A appears on the display of the cellular phone. If the user ("Yamauci") inputs his PIN on this screen, the screen of FIG. 13B appears next. Whether a toll is paid either by only a user or by a plurality of persons at an arbitrary split ratio can be specified on this screen. In the example shown in FIG. 13B, "2. split toll payment" is specified, and the screen of FIG. 13C is then displayed. On this screen, only the user name ("Yamauchi") is initially displayed. Additionally, the user inputs "Hirajima" and "Okada" as split toll payers, and their cellular phone numbers as shown in this figure (payers may be selected from a telephone book). The user further inputs their payment ratios (20, 40, and 40 percent in the example). Upon completion of all of the items, the user designates "Transmit".

Figure 13D:
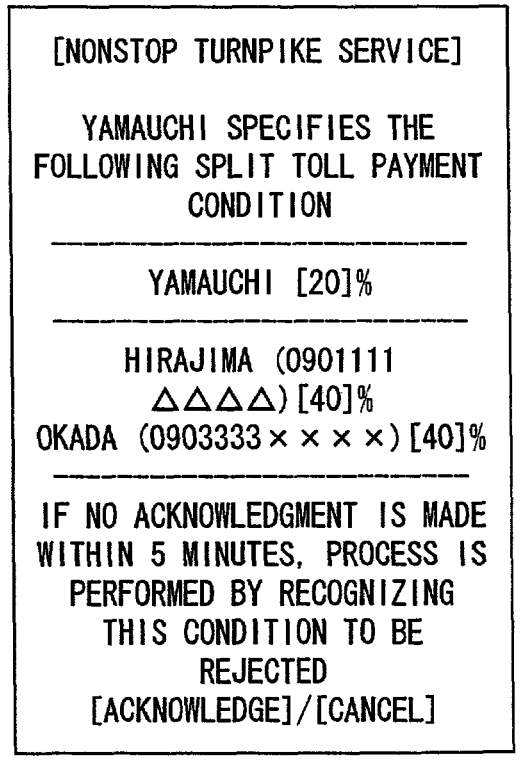

In response to this designation, e-mail transmitted from the computer 3 to the cellular phones of "Hirajima" and "Okada" become, for example, the contents shown in FIG. 13D.

If both of "Hirajima" and "Okada" do not make acknowledgment, for example, within 5 minutes as shown in FIG. 13D, the split toll payment is not applied (for example, forcibly changed to the payment made only by a user). In this way, even if an irrelevant person is erroneously specified as a split toll payer, this does not become problematic if acknowledgment is not made.

Assume that both of "Hirajima" and "Okada" make acknowledgment, no change is made to the split toll payers and the payment ratio, and their automobile (ordinary car) enters through Sapporo Interchange and exits from Abashiri Interchange. In this case, e-mail having the contents shown in FIG. 14A is transmitted to the cellular phone of each of the persons as a result of step S20 (S37).

Next, FIGS. 14B and 14C exemplify a display according to the different preferred embodiment.

In the initial (first) preferred embodiment, a user collectively sets also the information of split toll payers as shown in FIG. 13C. In the different second) preferred embodiment, however, each split toll payer invokes the turnpike use application of his or her cellular phone prior to the passage of a gate, and specifies/inputs an automobile identifier and a payment ratio, for example, on the screen shown in FIG. 14B. An automobile identifier maybe specified, for example, by pre-registering the automobile identifier of an automobile of a family, a friend, an acquaintance, etc., and by making a selection from the registered contents.

When passing through the gate in this state, the cellular phone returns a use notification signal including the automobile identifier, the payment ratio, and the number of the cellular phone itself. The computer 3 that receives these information via the gate searches the user master 70 shown in FIG. 12A by using the received automobile identifier as a key, records the cellular phone numbers of split toll payers and the payment ratios to the use journal 3c which corresponds to the user name ("Yamauchi" in this example) in the record whose automobile identifier 75 matches, and transmits e-mail including, for example, the contents shown in FIG. 14C to the user ("Yamauchi" in this example).

FIGS. 15A and 15C show the proceeding status of recording made to the use journal 3c based on the specific examples shown in FIGS. 13A to 13D and FIG. 14A. FIGS. 15A to 15C shows the proceeding status where some of the data items within the use journal 3c shown in FIG. 4C are recorded. Actually, however, also other data items are recorded. Additionally, data items (a payment type identifier 91 and a payment status identifier 92), which are not included in the use journal 3c shown in FIG. 4C, exist in FIG. 15. However, these items are not always required.

The use journal 3c is prepared for each user registered to the user maser 3a, and no items except for the cellular phone number of a user are recorded in the initial state as shown in FIG. 15A.

As described above, the contents shown in FIG. 13C are set on the cellular phone. When the user passes through the gate 1 at Sapporo Interchange being the entry, various data items shown in FIG. 15B are recorded to the use journal 3c of the user ("Yamauchi"). This example assumes that the application of the cellular phone 5 transmits to a gate a signal which includes also the payment type identifier according to the payment method specified in FIG. 13B, and the computer 3 records this identifier to the payment type identifier 91. Since the split toll payment is specified in the example shown in FIG. 13B, the identifier indicating the split toll payment is recorded to the payment type identifier 91.

Additionally, an identifier ("1" in this case) indicating that a payment is ready is recorded to the payment status identifier 92, if all of split toll payers make acknowledgment to the e-mail shown in FIG. 13D within 5 minutes.

When the automobile of the user arrives at the target interchange and passes through the gate 2 at Abashiri Interchange being the exit, data shown in FIG. 15C is recorded to the use journal 3c of the user ("Yamauchi"). In this figure, only "Abashiri" and "10,000" are newly recorded to the turnpike use endpoint 38 and the toll 39. Actually, a payment amount of each of the payers is calculated and recorded based on the toll 39 and the payment ratios 32, 40b and 41b. (This example assumes that no change is made to the split toll payers and the payment ratios).

FIG. 16 exemplifies the hardware configuration of the computer 3 (server) rendering the nonstop turnpike service according to the preferred embodiments.

A computer 100 shown in this figure comprises a CPU 101, a memory 102, an input device 103, an output device 104, an external storage device 105, a medium driving device 106, a network connecting device 107, etc., which are interconnected by a bus 108. The configuration shown in this figure is merely one example, and the present invention is not limited to this configuration.

The CPU 101 is a central processing unit that controls the whole of the computer 100.

The memory 102 is a memory such as a RAM, etc., which temporarily stores a program or data stored in the external storage device 105 (or onto a portable storage medium 109) at the time of program execution, data update, etc. The CPU 101 executes the above described processes by using the program/data loaded into the memory 102.

The input device 103 is, for example, a keyboard, a mouse, a touch panel, etc.

The output device 104 is, for example, a display, a printer, etc.

The external storage device 105 is, for example, a magnetic disc device, an optical disc device, a magneto-optical disc device, etc., and stores the program/data for implementing the various functions as the above described toll road toll paying apparatus (the data shown in FIGS. 4A to 4C or the program for executing the processes shown in FIGS. 5, 7, etc.).

The medium driving device 106 reads the program, data, etc., which are stored onto the portable storage medium 109. The portable storage medium 109 is, for example, an FD (Flexible Disk), a CD-ROM, a DVD, a magneto-optical disc, etc.

The network connecting device 107 makes a connection to a network, and enables the transmission/reception of a program/data to/from an external information processing device.

Figure 17:
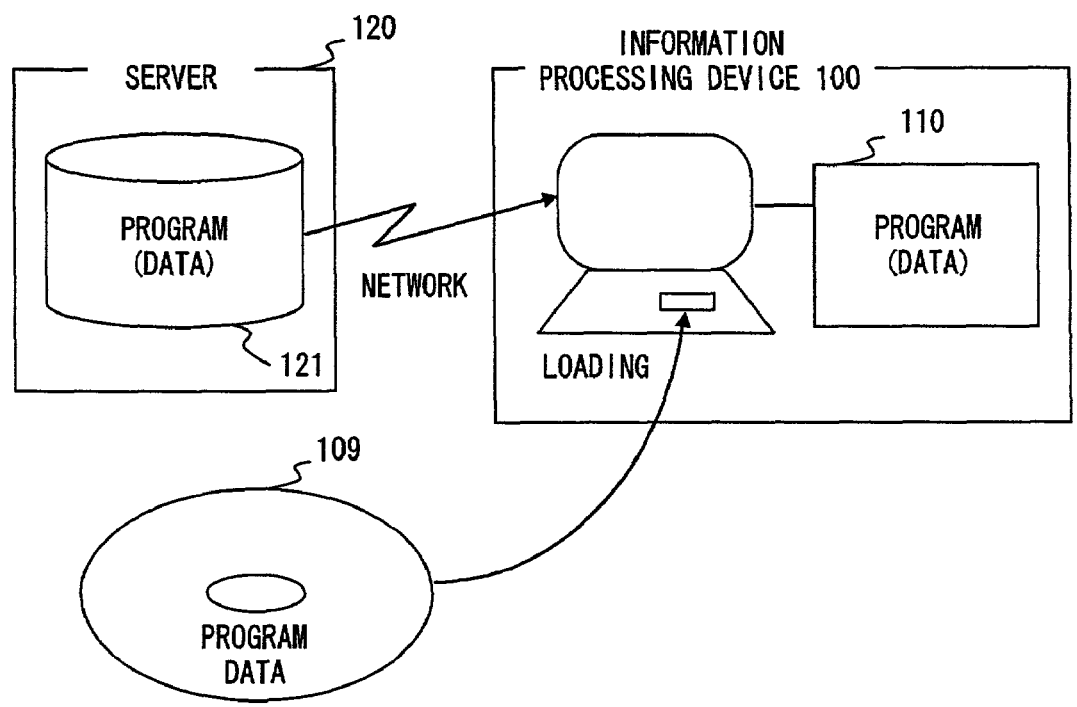
FIG. 17 exemplifies storage media.

FIG. 17 exemplifies storage media.

As shown in this figure, the program/data for implementing the above described functions of the present invention may be loaded from the portable storage medium 109 storing the program/data to the information processing device (computer) 100 side, stored in the memory 102, and executed. Or, the above described program/data, which are stored in a storing unit 121 of an external server 120, may be downloaded via a network (the Internet, etc.) connected by the network connecting device 107.

Additionally, the present invention can be configured not only as an apparatus/method, but also as a storage medium (the portable storage medium 109, etc.) storing the above described program/data, or as a propagation signal of the above described program.

As described above in detail, with the toll road toll paying method using a portable terminal according to the present invention, a toll can be paid nonstop and cashless by using a cellular phone having a high ownership rate, or the like without requiring a dedicated device, the case where a plurality of persons possessing a portable terminal are riding in an automobile can be supported, and a turnpike (toll road) toll can be paid by being shared or split at an arbitrary split ratio.

What is claimed is:

1. A method of splitting a toll for traveling on a toll road, the method comprising:

receiving, by a gate on the toll road, a plurality of use notification signals transmitted from a plurality of respective cellular phones, each cellular phone belonging to a different respective split toll payer inside of the same automobile traveling on the toll road, wherein each of the plurality of use notification signals includes an automobile identifier that identifies the automobile, a respective payment ratio of the respective split toll payer which specifies a respective portion of the toll for traveling on the toll road which is to be paid by the respective split toll payer, and a respective phone number of the respective cellular phone;

communicating, by the gate, the automobile identifier, the respective payment ratios, and the respective phone numbers to a computer;

matching, by the computer, the automobile identifier to an identifier of a user, using stored information;

transmitting, by the computer, an e-mail to the user notifying the user of one of the respective payment ratios; and determining, by the computer, that the user has accepted or rejected the one of the respective payment ratios.

2. A system for splitting a toll, the toll being for traveling on a toll road, the system comprising:

a processor; and a memory, communicatively coupled to the processor;

wherein the processor is configured to perform a method comprising:

receiving, from a gate on the toll road, an automobile identifier, a plurality of payment ratios, and a plurality of phone numbers, wherein the gate received the automobile identifier, the plurality of payment ratios, and the plurality of phone numbers via a plurality of use notification signals transmitted from a plurality of respective cellular phones, each cellular phone belonging to a different respective split toll payer inside of the same automobile traveling on the toll road, wherein each of the plurality of use notification signals included:

the automobile identifier, which identifies the automobile;

a respective payment ratio of the plurality of payment ratios, the respective payment ratio corresponding to the respective split toll payer and specifying a respective portion of the toll for traveling on the toll road which is to be paid by the respective split toll payer; and a respective phone number of the plurality of phone numbers, the respective phone number being of the respective cellular phone;

matching the automobile identifier to an identifier of a user, using stored information;

transmitting an e-mail to the user notifying the user of one of the respective payment ratios; and determining that the user has accepted or rejected the one of the respective payment ratios.

3. A non-transitory computer-readable storage medium storing a computer program, the computer program comprising instructions for causing a computer to perform a method of splitting a toll for traveling on a toll road, the method comprising:

receiving, from a gate on the toll road, an automobile identifier, a plurality of payment ratios, and a plurality of phone numbers, wherein the gate received the automobile identifier, the plurality of payment ratios, and the plurality of phone numbers via a plurality of use notification signals transmitted from a plurality of respective cellular phones, each cellular phone belonging to a different respective split toll payer inside of the same automobile traveling on the toll road, wherein each of the plurality of use notification signals included:

the automobile identifier, which identifies the automobile;

a respective payment ratio of the plurality of payment ratios, the respective payment ratio corresponding to the respective split toll payer and specifying a respective portion of the toll for traveling on the toll road which is to be paid by the respective split toll payer; and a respective phone number of the plurality of phone numbers, the respective phone number being of the respective cellular phone;

matching the automobile identifier to an identifier of a user, using stored information;

transmitting an e-mail to the user notifying the user of one of the respective payment ratios; and determining that the user has accepted or rejected the one of the respective payment ratios.

* * * * *